United States Patent
Ohuchi et al.

(10) Patent No.: US 6,590,744 B1
(45) Date of Patent: Jul. 8, 2003

(54) DISK DRIVE

(75) Inventors: Hironobu Ohuchi, Saitama (JP); Kazushige Kawazoe, Kanagawa (JP)

(73) Assignee: Sony Corporation, Toyko (JP)

( * ) Notice: Subject to any disclaimer, the term of this patent is extended or adjusted under 35 U.S.C. 154(b) by 63 days.

(21) Appl. No.: 09/610,625

(22) Filed: Jul. 5, 2000

(30) Foreign Application Priority Data

Jul. 5, 1999 (JP) .......................................... 11-189911

(51) Int. Cl.$^7$ ................................................ G11B 5/58
(52) U.S. Cl. .................................................. 360/234.7
(58) Field of Search ........................... 360/234.7, 234.8, 360/234.9, 235.1, 235.3, 243.7, 243.8, 243.9, 235.2, 135, 234, 234.3, 236.1

(56) References Cited

U.S. PATENT DOCUMENTS

| | | | | |
|---|---|---|---|---|
| 4,631,609 A | * | 12/1986 | Erickson et al. ............ | 360/135 |
| 5,527,479 A | * | 6/1996 | Nagataki et al. ............ | 508/205 |
| 5,680,285 A | * | 10/1997 | Nakamura et al. .......... | 360/135 |
| 5,835,305 A | * | 11/1998 | Hamaguchi et al. ........ | 360/103 |
| 6,021,024 A | * | 2/2000 | Akiyama et al. ........... | 360/106 |
| 6,071,609 A | * | 6/2000 | Furutani et al. | |
| 6,108,169 A | * | 8/2000 | Liu et al. .................... | 360/135 |
| 6,130,807 A | * | 10/2000 | Marchon .................... | 360/135 |
| 6,181,521 B1 | * | 1/2001 | Yonemura et al. ........ | 360/244.8 |
| 6,264,848 B1 | * | 7/2001 | Belser et al. ................. | 216/22 |
| 6,335,080 B1 | * | 1/2002 | Weiss et al. ................ | 428/141 |
| 6,429,999 B1 | * | 8/2002 | Dague et al. ............. | 360/97.01 |

FOREIGN PATENT DOCUMENTS

| | | | | |
|---|---|---|---|---|
| JP | 63029319 A | * | 2/1988 | ............ G11B/5/82 |
| JP | 01294219 A | * | 11/1989 | ............ G11B/5/82 |
| JP | 02091813 A | * | 3/1990 | ........... G11B/5/704 |

* cited by examiner

*Primary Examiner*—Hoa T. Nguyen
*Assistant Examiner*—Dzung C. Nguyen
(74) *Attorney, Agent, or Firm*—Jay H. Maioli

(57) ABSTRACT

A disk drive using a disk including a substrate made from a high polymer material is capable of reducing a spacing between a head slider and the disk to a value comparable to a spacing between the head slider and a disk having a glass substrate. A head slider of a disk drive, which is flied against the disk formed with a high polymer substrate, is specified such that a width W is in a range of 1.5 mm or less, and a length L is in a range of 1.8 mm or less, preferably, in a range of 1.25 mm or less. With this configuration, it is possible to realize a stable low flight height without the contact of the head slider with a disk and hence to realize high density recording, even if the disk is formed with a high polymer substrate in which a radius of curvature in the radial direction is about 10 m and a radius of curvature in the circumferential direction is about 20 m. Further, a head is fixed at a central portion of at least one of a pair of rails symmetrical in the width direction of the head slider. With this configuration, it is possible to reduce a variation in flight height of the head and hence to improve the quality of recording/reproducing signals.

24 Claims, 12 Drawing Sheets

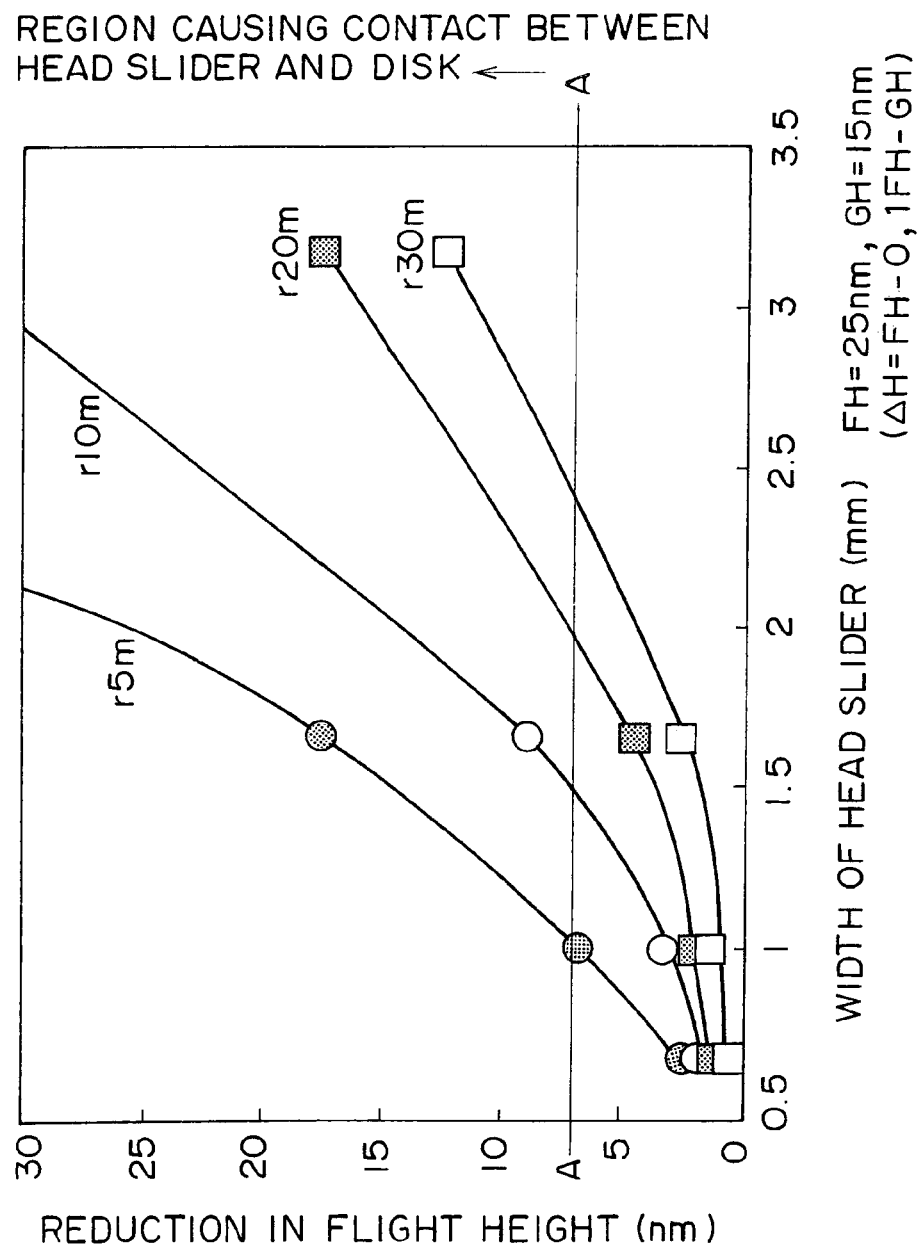

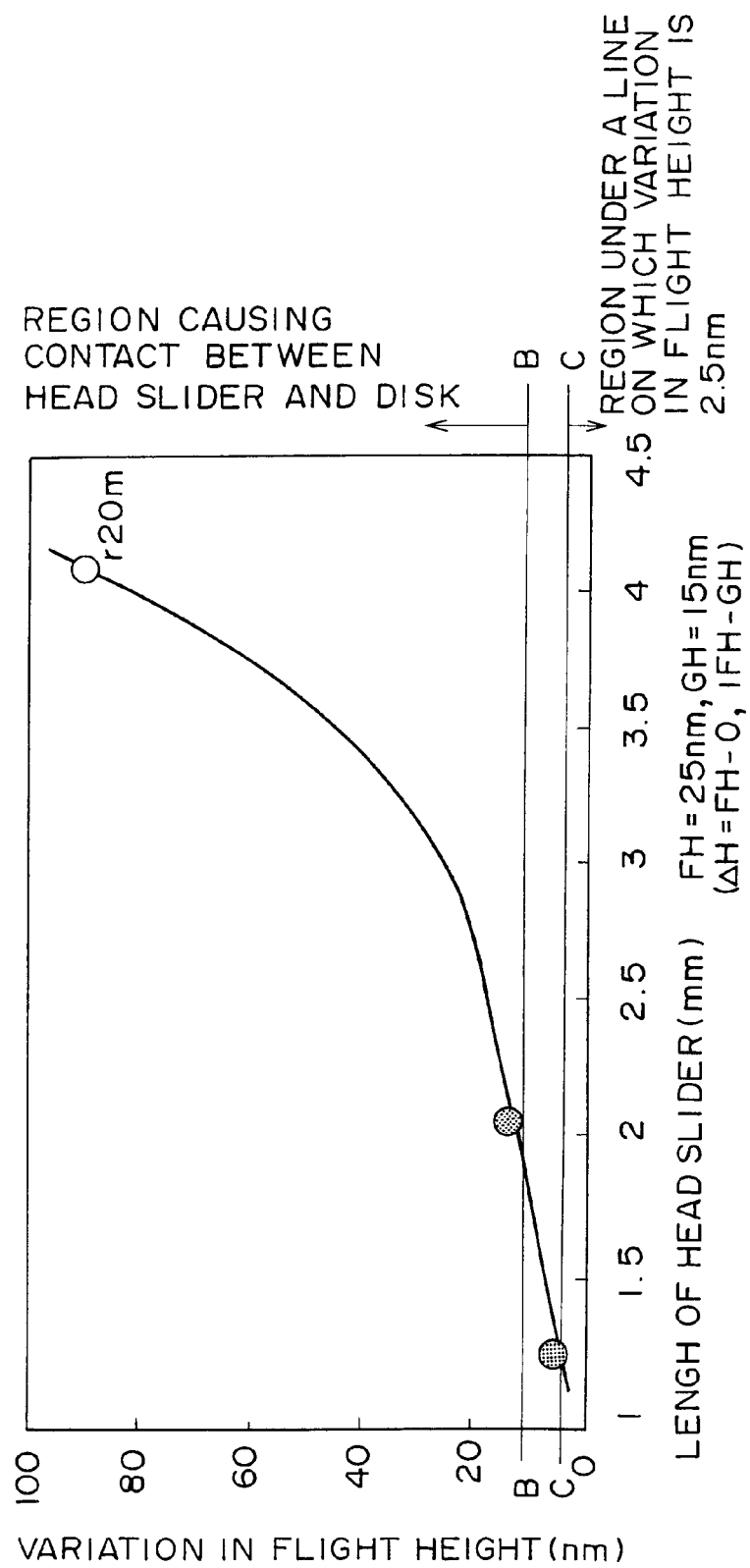

DISK DRIVE

BACKGROUND OF THE INVENTION

1. Technical Field of the Invention

The present invention relates to a disk drive used for recording or reproducing data on or from a disk including a substrate made from a high polymer material. In particular, the present invention relates to a disk drive including a head slider having a configuration optimum to record or reproduce data on or from a disk including a high polymer substrate.

2. Description of the Prior Art

Along with the recent growth of information processing technology, it has become increasingly necessary to develop disk drives capable of realizing large recording capacities and high-speed recording/reproducing of data. In particular, magnetic disks and magneto-optical disks, which can be manufactured on large scales at low costs, are expected to be used not only for large-sized computers and personal computers, but also for devices to meet requirements of the recent multi-media age, such as image/audio communication systems, facsimile transmitters/receivers, printers, displays, image displays, and other information memories associated with various apparatuses.

Of various disk drives, such as a magnetic disk drive, a magneto-optical disk drive, and an optical disk drive, the magnetic disk drive is most popular. A configuration example of such a magnetic disk drive is shown in FIG. 1. Referring to FIG. 1, the magnetic disk drive includes a housing 101, a spindle motor 102, and a magnetic disk 200 rotated by the spindle motor 102. In operation of the magnetic disk drive, a head slider 104 is located at a desired position on the magnetic disk 200 by a movable actuator 103, to allow a head mounted on the head slider 104 to write or read data on or from the magnetic disk 200.

The housing 101 made from an aluminum alloy, a hard plastic resin, or the like has a substantially flat upper surface on which the spindle motor 102 is disposed.

The spindle motor 102 is configured as a flat brushless motor, which is driven with its angular velocity controlled at a constant value for rotating the magnetic disk 200 in the direction R1.

The magnetic head mounted on the head slider 104 is flied in such a manner as to face to the disk, to write or read data on or from the disk. The head slider is driven by the movable actuator 103. A configuration of the movable actuator 103 is shown in FIG. 2.

The movable actuator 103 shown in FIG. 2 includes the flying type head slider 104, an elastic member 105 for supporting the head slider 104, an arm 106 for supporting the elastic member 105, a vertical shaft 107 for movably supporting one end of the arm 106, and a motor 108 for turning the arm 106 around the vertical shaft 107.

An air flow passage, allowing flow-in/flow-out of air, is formed in the back surface of the head slider 104 and, upon rotation of the magnetic disk 200, the head slider 104 is flied from the surface of the magnetic disk 200 with a slight spacing formed between the back surface of the head slider 104 and the front surface of the magnetic disk 200. In such a state, data is written on or read from, that is, recorded on or reproduced from, the magnetic disk 200 by the head mounted on the head slider 104.

The flight height of the head slider has been generally set in a range of about 0.1 $\mu$m or less; however, it tends to become gradually smaller along with the increased capacity of a magnetic disk. At present, a disk drive with the flight height reduced to a value in a range of about 20 nm to about 40 nm is being developed.

The arm 106, which is made from a rigid material, is turned around the vertical shaft 107 to move the head slider 104 in the radial direction R3 (see FIG. 1) of the magnetic disk 200 for seeking operation, so that the magnetic head mounted on the head slider 104 accesses a desired track of the magnetic disk 200.

The motor 108 includes a voice coil 109 mounted to the other end of the arm 106, and a magnet 110 fixed on the housing 101. A drive voltage is supplied from an external source to the voice coil 109, to drive the voice coil 109 in the direction R2.

When a drive current is supplied from an external source to the voice coil 109, the arm 106 is turned around the vertical shaft 107 on the basis of a force generated by a magnetic field of the magnet 110 and a current flowing in the voice coil 109. As a result, the head slider 104 mounted to the other end of the arm 106 is moved substantially in the radial direction of the magnetic disk 200 as shown by the arrow R3 in FIG. 1, and the magnetic head mounted on the head slider 104 records or produces information on or from a specific track of the magnetic disk 200.

A detailed configuration of the head slider 104 is shown in FIG. 3. The head slider 104 retains a magnetic head 301 as a recording/reproducing element at a position close to the disk, and causes the magnetic head 301 to write or read signals on or from the disk. A surface, facing to the disk, of the head slider 104, that is, the upper surface of the head slider 104 in FIG. 3 has rails 302 which receive the pressure of air flowing between the head slider 104 and the disk, thereby slightly flying the head slider 104 from the disk. The related art head slider 104 is generally formed into a rectangular parallelopiped shape having a width W of 1.6 mm or more, a length L of 2.05 mm or more, and a height H of 0.43 mm or more.

FIG. 4 is a conceptual view showing a state that the head slider 104 is flied from the disk 200 for allowing the head to write or read data on or from the disk 200, and also showing an air flow generated on the surface of the disk. The head slider 104 is supported by the elastic member 105, which is in turn supported by the rigid arm 106. The head 301 is fixed to the tip of the head slider 104. The disk is rotated in the direction shown by an arrow from the arm 106 side to the head slider 104. In this case, as shown in FIG. 4, an air flow based on the viscosity of air is generated on the surface of the disk, and accordingly the head slider 104 is controlled by the air flow to be slightly flied from the surface of the disk 200, and in such a state, the head slider 104 causes the head 301 to write or read data on or from the disk 200.

A general structure of a magnetic disk used for a magnetic disk drive will be described with reference to FIG. 5. Referring to FIG. 5, the previously proposed magnetic disk 200 has an under layer 202, a magnetic recording layer 203, and a protective layer 204 sequentially formed on each of polished front and back surfaces of a substrate 201 made from an aluminum alloy or glass.

The substrate 201, which has been mainly made from an aluminum alloy or glass, is to be made from a high polymer material such as polycarbonate, polyolefin, polystyrene, or poly methyl methacrylate (PMMA) and is widely available not only for magnetic disks but also for magneto-optical disks.

The disk having such a configuration differs in rigidity depending on the kind of substrate material and may cause various kinds of deformation in service environments. For example, the mounting configuration of the disk to a spindle motor by using a damper gives stress to the disk, which may cause distortion and waviness, and high-speed rotation of the disk causes the runout of the disk surface at the outer periphery. In particular, the disk including a high polymer substrate tends to cause large waviness and large runout of the disk surface.

On the other hand, as described above, the flight height of a head slider from the surface of a disk has been required to be reduced to 0.1 μm or less, and recently, to the order of about 20 nm to about 40 nm. To realize such a flight height, the surface of a disk made from an aluminum alloy or glass is polished during the manufacturing process of the disk for improving the smoothness of the surface of the disk; however, it is difficult to polish the surface of a disk including a substrate made from a high polymer material such as polycarbonate, polyolefin, polystyrene, or PMMA during the manufacturing process of the disk and, therefore, it is difficult to ensure the smoothness of the surface of the disk including a high polymer substrate comparable to that of the disk including the aluminum or glass substrate.

In addition to the above-described problem with surface smoothness, the disk including a high polymer substrate presents another problem in that distortion occurs easily over the entire disk surface, as compared with the disk including the substrate made from an aluminum alloy, glass or the like. For example, in manufacture of the disk including the glass substrate, a radius of curvature over the front surface of the disk can be made in the order of about 30 m. On the contrary, for the disk including a substrate made from a high polymer material such as polycarbonate, polyolefin, polystyrene, or PMMA, it is impossible to manufacture the disk having a large radius of curvature over the front surface of the disk. For example, part of the disk sometimes has a radius of curvature being as small as about 10 m to about 20 m. More concretely, the disk has a radius of curvature ranging from 10 m to 20 m in the radial direction, and a radius of curvature ranging from 20 m to 30 m in the circumferential direction.

SUMMARY OF THE INVENTION

To realize high density recording/reproducing of data, it is required to make a head slider operate closer to a disk, that is, reduce a spacing between the head slider and the disk. In the case of flying the head slider against a disk including a high polymer substrate, which is poor in flatness, however, the reduction in spacing between the head slider and the disk raises the possibility that the head slider comes in contact with the disk, and accordingly, it is difficult to ensure a small spacing similar to that between the head slider and the disk including the aluminum or glass substrate.

The present invention has been made to solve the above-described problems of the related art disk drive, and an object of the present invention is to provide a disk drive using a disk including a substrate made from a high polymer material, which is capable of reducing a spacing between a head slider and the disk to a value comparable to a spacing between the head slider and a disk including an aluminum or glass substrate.

Another object of the present invention is to provide a disk drive of the present invention, which is capable of recording data on a disk including a substrate made from a high polymer material at a density higher than that obtained by using a related art disk drive by reducing a spacing between a head slider and the disk formed with a high polymer substrate.

To achieve the above objects, according to a first aspect of the present invention, there is provided a disk drive including: a disk including a substrate made from a high polymer material; a head flied from the front surface of the disk upon rotation of the disk for recording or reproducing data on or from the disk; and a head slider on which the head is mounted; wherein the head slider is formed into an approximately rectangular shape and is specified such that a width W along the direction substantially parallel to the radial direction of the disk is in a range of 0.5 mm to 1.5 mm, and a length L along the direction substantially parallel to the circumferential direction, that is, the rotational direction of the disk is in a range of 0.5 mm to 1.8 mm.

In the above disk drive of the present invention, preferably, the head slider is mounted on an elastic supporting member constituting an actuator movable substantially in the radial direction of the disk in which a surface, facing the disk, of the head slider has a projection which projects on the front surface side of the disk, the projection being configured as two rails symmetrical in the width direction of the head slider with respect to the longitudinal axis of the head slider; and the head is mounted to the tip or its neighborhood of at least one of the rails, the mounting position of the head being either a central portion of the rail in the width direction parallel to the width direction of the head slider or a position offset inwardly from the central portion of the rail to the center of the head slider in the width direction.

In the above disk drive of the present invention, preferably, the head slider is mounted on an elastic supporting member constituting an actuator movable substantially in the radial direction of the disk, in which a surface, facing the disk, of the head slider has a projection which projects on the front surface side of the disk, the projection being configured as an island rail formed at a central portion of the head slider in the width direction; and the head is mounted to the tip or its neighborhood of the rail, the mounting position of the head being a central portion or its neighborhood of the rail in the width direction parallel to the width direction of the head slider.

In the above disk drive of the present invention, preferably, the head slider has a length L in a range of 1.25 mm or less.

In the above disk drive of the present invention, preferably, the disk is configured as a disk including a substrate made from either of polycarbonate, polyolefin, polystyrene, and poly methyl methacrylate (PMMA).

In the above disk drive of the present invention, preferably, the disk is configured as a disk including a high polymer substrate in which a radius of curvature in the radial direction is in a range of 10 m to 20 m, and a radius of curvature in the circumferential direction is in a range of 20 m to 30 m.

In the above disk drive of the present invention, preferably, the disk is configured as a disk including a high polymer substrate in which a glide height is in a range of 15 nm or less.

BRIEF DESCRIPTION OF THE DRAWINGS

FIG. 8 is a graph showing a relationship between a reduction in flight height of the head slider and a width of the slider.

FIG. 9 is a graph showing a relationship between a variation in flight height of the head slider and a length of the slider.

DETAILED DESCRIPTION OF THE PREFERRED EMBODIMENT

Hereinafter, a disk drive according to the present invention will be described in detail.

Figure 6:
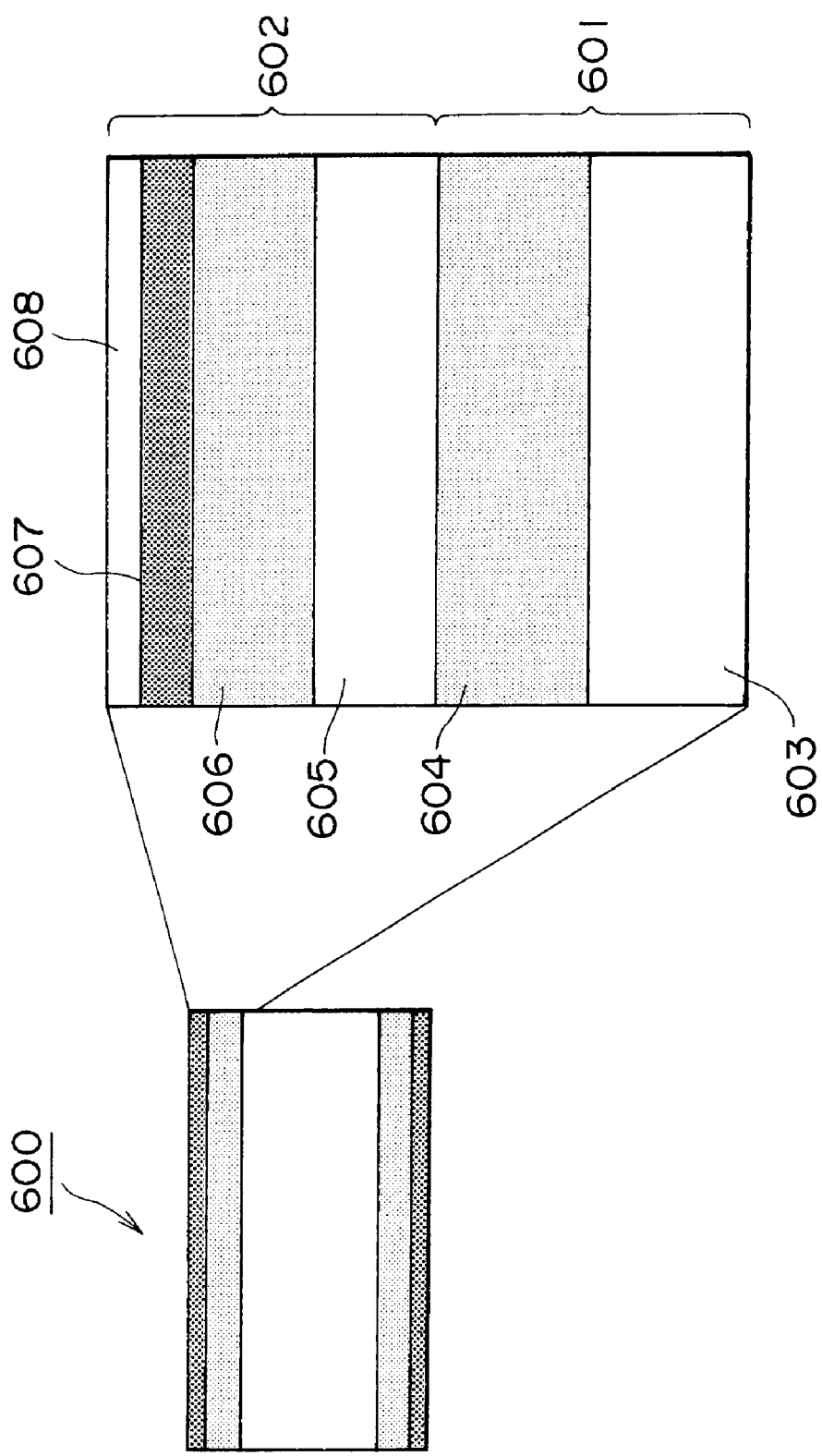
FIG. 6 is a sectional view for conceptually illustrating a posture of the head slider flied over the disk and an air flow generated on the disk.

FIG. 6 shows a configuration of a disk including a substrate made from a high polymer material, which disk is driven by the disk drive of the present invention. Referring to FIG. 6, the disk includes a substrate portion 601 and a thin film portion 602 having an under film 605, a recording film 606, a protective film 607, and a lubricant 608.

The substrate portion 601 is made from a high polymer material such as polycarbonate, polyolefin, polystyrene, or PMMA. The substrate portion 601 may be configured to have a base layer 603 and a reinforcing layer 604 as shown in FIG. 6. The base layer 603 is made from a high polymer material such as polycarbonate, polyolefin, polystyrene, or PMMA. The reinforcing layer 604 is a layer treated to increase the hardness of the disk, which layer is typically configured as a high hardness film made from diamond-like carbon, or a layer formed by adding a filler such as carbon to the same high polymer material as that of the base layer 603.

The disk drive of the present invention is characterized by using the disk including a high polymer substrate as shown in FIG. 6. A disk including a high polymer substrate, however, is generally disadvantageous in that, as described above, large distortion and large waviness of the disk occur due to stress caused by mounting, that is, clamping of the disk to the disk drive and, also, the runout of the disk surface due to high-speed rotation becomes larger than that of a disk formed with a substrate made from glass or aluminum.

For example, in the manufacture of a disk including a glass substrate, a radius of curvature over the front surface of the disk can be made in the order of 30 m. On the contrary, for a disk including a substrate made from a high polymer material such as polycarbonate, polyolefin, polystyrene, or PMMA, it is impossible to manufacture the disk having a large radius of curvature over the front surface of the disk. For example, part of the disk sometimes has a radius of curvature being as small as about 10 m to about 20 m. More concretely, the disk has a radius of curvature ranging from about 10 m to about 20 m in the radial direction and a radius of curvature ranging from about 20 m to about 30 m in the circumferential direction.

To realize high density recording/reproducing of data, it is required to make a head slider operate closer to a disk, that is, to make smaller a spacing between the head slider and the disk; however, it is not allowed to cause the contact between the head slider and the disk during recording/reproducing of data.

Figure 7:
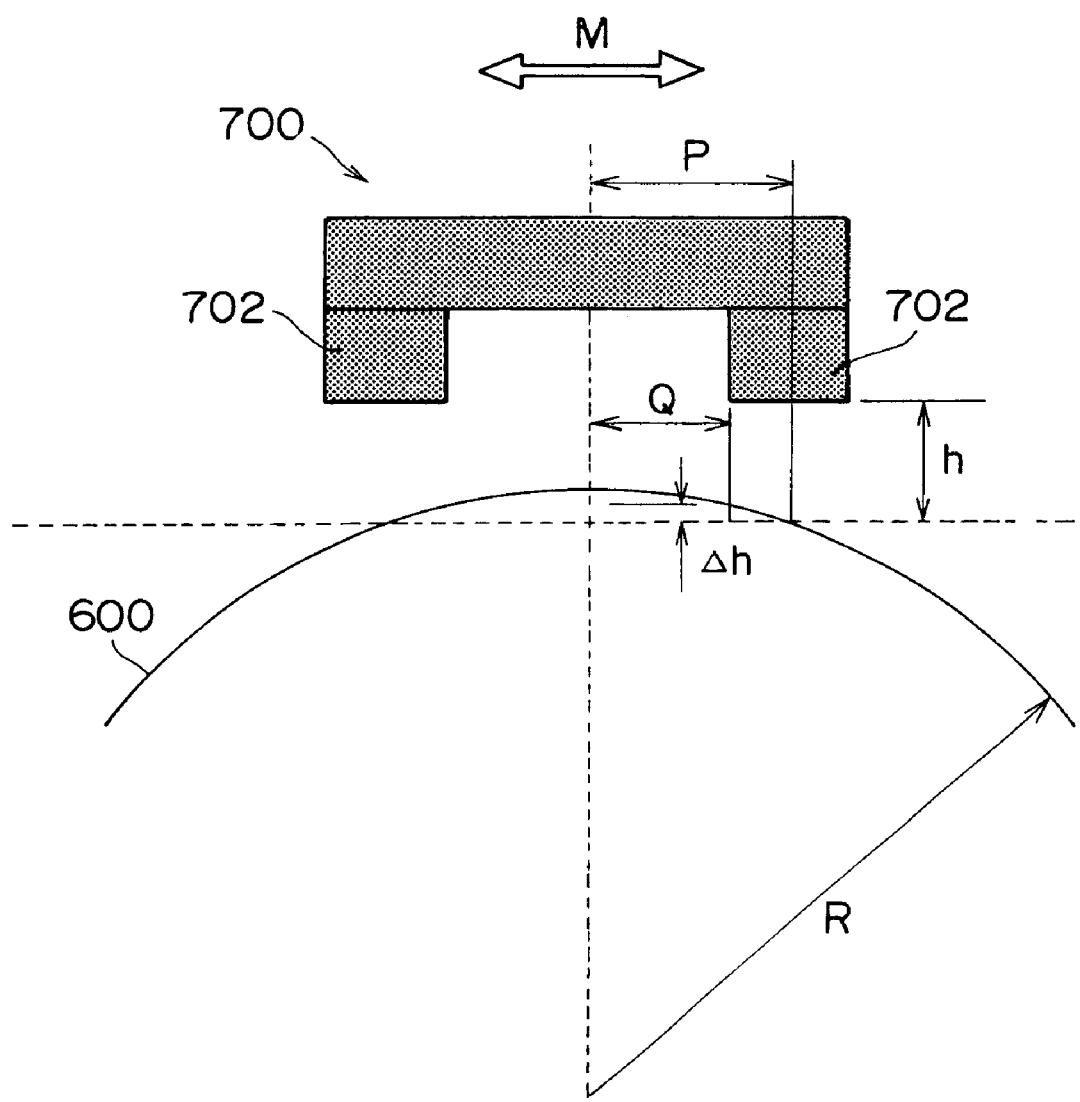
FIG. 7 is a sectional view of the disk and the head slider for illustrating a relationship between a radius R of curvature of the disk in the radial direction and a variation in flight height of the head slider.

FIG. 7 is a sectional view of a disk 600 and a head slider 700 for illustrating a relationship between a radius of curvature of the disk 600 in the radial direction and a variation in flight height of the head slider 700. The flight height of the head slider 700 is taken as "h", and the radius of curvature of the disk 600 is taken as "R". Referring to FIG. 7, the head slider 700 is moved in the radial direction of the disk, that is, in the direction shown by an arrow M in FIG. 7. In this case, a portion, being nearest to the disk 600, of the head slider 700 comes closer to the disk 600 by a distance of $\Delta h$, where $\Delta h$ shows a reduction in flight height of the head slider.

The smaller the radius R of curvature, the larger the distance $\Delta h$. Accordingly, if the radius R of curvature becomes smaller, the possibility of contact between the head slider 700 and the disk 600 becomes larger.

Assuming that the head slider 700 shown in FIG. 7 has a structure such that a width W is 1.6 mm, a length L is 2.05 mm, a height H is 0.43 mm, and a width of each of two rails 702 is 300 $\mu$m, a distance P between the center of the head slider 700 and the center of each rail 702 becomes P=0.65 mm, and a distance Q between the center of the head slider 700 and an inner end surface of the rail 702 becomes Q=0.5 mm.

For the head slider 700 having such a structure, if the radius R of curvature of the disk 600 in the radial direction is 35 m, the reduction $\Delta h$ in flight height becomes 2.6 nm; and if the radius R of curvature of the disk 600 in the radial direction is 10 m, the reduction $\Delta h$ in flight height becomes 8.6 nm.

Assuming that a glide height (GH) of the disk 600 is 15 nm, a flight height (FH) of the head slider 700 having the above structure is 25 nm, and a variation in flight height is 10% of the flight height, that is, 2.5 nm, if the radius R of curvature of the disk 600 is 35 m, the head slider 700 does not come in contact with the disk 600; however, if the radius R of curvature of the disk 600 is 10 m, the head slider 700 comes in contact with the disk 600. It should be noted that the term "glide height" means the height of a texture, i.e. microscopic irregularities, formed on the surface of the disk to prevent the head slider from clinging to the disk when the disk is stationary. While large enough to prevent the head slider from clinging to the disk, these irregularities are not so large as to cause unwanted contact between the head slider and the disk.

The recording density of the disk can be improved by flying the head slider in such a manner that the head slider comes closer to the disk, that is, the flight height becomes smaller. In general, to realize a high recording density of 10 Gbit/in$^2$ or more, the disk drive is required to be operated under conditions that the flight height of the head slider is 25 nm or less, the variation in flight height is 10% or less of the flight height, and the glide height of the disk is 15 nm at maximum. In operation of the disk drive under these conditions, however, if the flight height of the head slider, which is required to be kept in the range of 25 nm or less as described above, is reduced from 25 nm by a value of 7.5 nm or more, there occurs contact between the head slider and the disk.

To be more specific, under the above conditions that the maximum flight height (FH) is 25 nm, the variation in flight height is 10% of the flight height, that is, 0.1FH, and the maximum glide height (GH) is 15 nm, the maximum reduction $\Delta h$ in flight height is calculated on the basis of an equation of $\Delta h = FH - 0.1FH - GH$, and accordingly, becomes 7.5 nm (25 - 0.1 × 25 - 15).

FIG. 8 shows a relationship between the reduction in flight height of the head slider ($\Delta h$) and the width W of the head slider (see FIG. 3), which is obtained by a geometrical relation between the head slider and the shape of the disk. ($\Delta h = W(((R/W)^2 - \beta^2)^{1/2} - ((R/W)^2 - \alpha^2)^{1/2})$ where $P = \alpha W$; $Q = \beta W$; $\alpha > \beta$; $\alpha$, $\beta$: constant). To be more specific, this figure shows a relationship between a reduction (nm) in flight height ($\Delta h$) and a width (mm) of the head slider in the case of flying the head slider to each of a number of disks having four kinds of radii of curvature (r=5 m, 10 m, 20 m, and 30 m) under conditions that the glide height of the disk is set at 15 nm and the flight height of the head slider is set at 25 nm. In this figure, a line A—A indicates a reference flight height (7.5 nm) required for achieving a high recording density of 10 Gbit/in$^2$ or more.

The combination of values of a reduction in flight height and a width of the head slider present in a region over the line A—A in FIG. 8 raises the possibility that the head slider may come in contact with the disk. As a result, to carry out writing/reading of data without the contact of the head slider with the disk, the combination of values of a reduction in flight height and a width of the head slider must be present in a region under the line A—A indicating the flight height of 7.5 nm. In addition, if the width of the head slider is in a range of 0.5 mm or less, it is difficult to form a stable air flow-in/flow-out passage, and accordingly the lower limit of the width W of the head slider must be set at about 0.5 mm.

As described above, the disk including a high polymer substrate has a radius of curvature ranging from about 10 m to 20 m in the radial direction. Accordingly, to realize the head slider configuration that will not contact the disk formed with a high polymer substrate in which the radius of curvature in the radial direction is 10 m (the minimum radius of curvature in the above range), it is apparent from the curve of "r10 m" in FIG. 8 that the width W of the head slider must be set at 1.5 mm or less.

To prevent occurrence of contact of the head slider with the disk, it is also required to examine the radius of curvature of the disk in the circumferential direction. As described above, for the disk including a substrate made from a high polymer material such as polycarbonate, polyolefin, polystyrene, or PMMA, the radius of curvature of the disk in the circumferential direction becomes a value ranging from about 20 m to 30 m. Like the above-described relationship shown in FIG. 7, the contact of the head slider with the disk in the circumferential direction is dependent on the variation in flight height, the radius of curvature of the disk, and the like.

Figure 1:
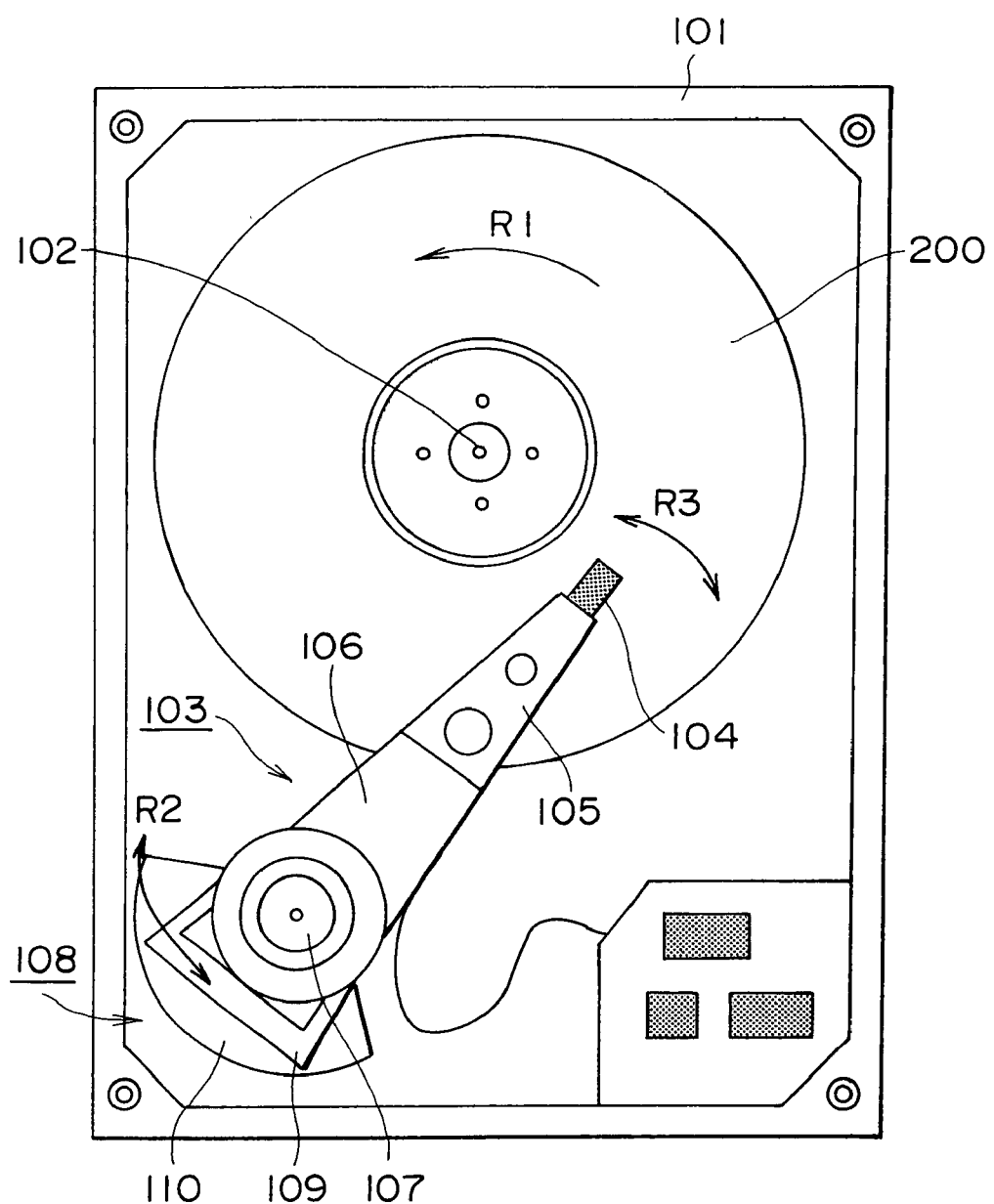
FIG. 1 is a plan view showing a configuration of a general magnetic disk drive.
Figure 2:
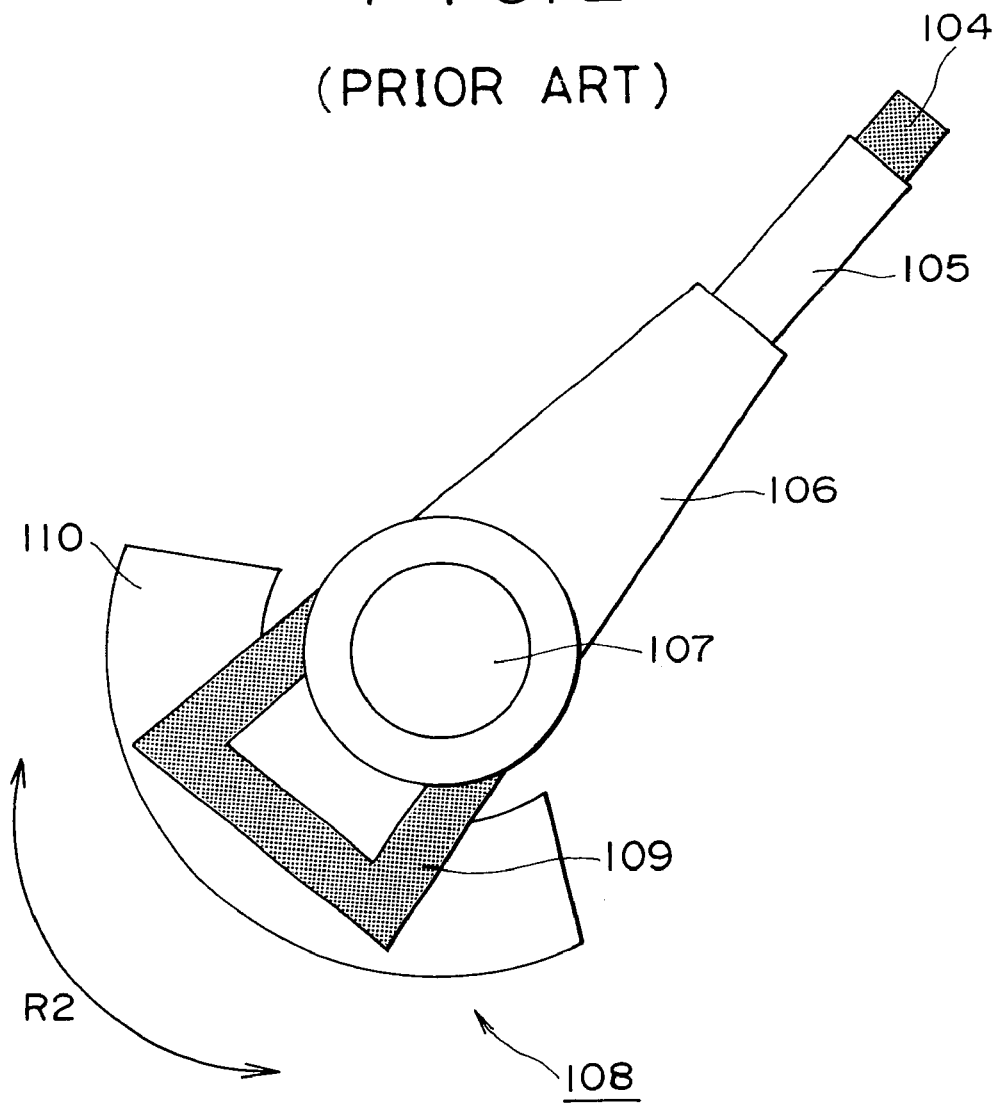
FIG. 2 is a plan view showing a configuration of a movable actuator of the general magnetic disk.
Figure 3:
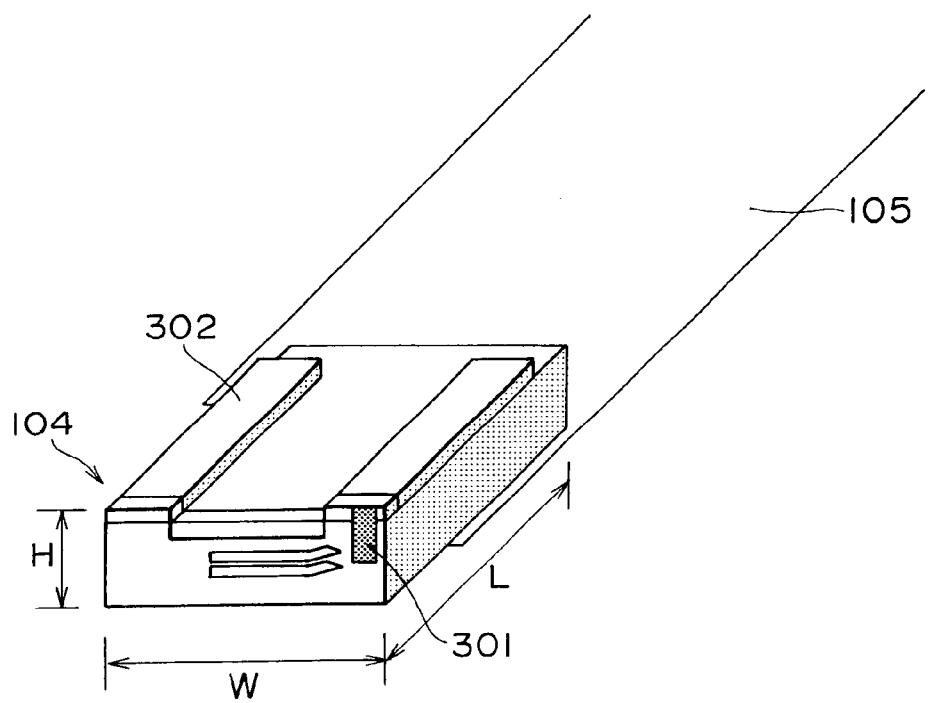
FIG. 3 is a perspective view showing a detailed configuration of a head slider of the movable actuator.

FIG. 9 shows a relationship between a variation in flight height of the head slider and a length L of the head slider (see FIG. 3). To be more specific, FIG. 9 shows a relationship between a variation in flight height of the head slider and a length of the head slider in the case of flying the head slider against the disk in which the radius "r" of curvature of the disk in the circumferential direction is 20 m under conditions that the glide height of the disk is 15 nm, the width of the head slider is 1.5 mm, and the flight height is 25 nm. At that time, the rotational speed of the disk is 12~14 m/s.

The combination of values of a variation in flight height and a length of the head slider present in a region over a line B—B in FIG. 9 causes contact of the head slider with the disk. To carry out writing/reading of data without contact of the head slider with the disk, the combination of values of a variation in flight height and a length of the head slider must be present in a region under the line B—B. As described above, the radius of curvature of the disk including a high polymer substrate becomes about 20 m in the circumferential direction at minimum. Accordingly, to realize the head slider configuration being out of contact with the disk formed with a high polymer substrate in which the minimum radius of curvature, in the circumferential direction is 20 m, it is apparent from the graph shown in FIG. 9 that the length L of the head slider must be 1.8 mm or less. Additionally, if the length of the head slider is 0.5 mm or less, it is difficult to form a stable air flow-in/flow-out passage in the rotational direction, that is, in the circumferential direction of the disk, and thereby it is impossible to obtain a stable flying characteristic. As a result, the lower limit of the length L of the slider is required to be set at about 0.5 mm.

To set the variation in flight height of the head slider in a range of 10% or less of the flight height, that is, 2.5 nm or less, the length of the head slider is required to be set in a region under a line C—C (variation in flight height: 2.5 nm) in FIG. 9, that is, in a range of 1.25 nm or less.

In the case of flying the head slider against the disk including a high polymer substrate in which the radius of curvature in the radial or circumferential direction is smaller than that of a disk including a glass or aluminum substrate, that is, the deformation is larger than that of the disk formed with a glass or aluminum substrate, it is possible to prevent contact of the head slider with the disk by specifying the width W and the length L of the head slider, as described above.

More particularly, by specifying the width W of the head slider in the range of 1.5 mm or less, it is possible to realize a high recording density of 10 Gbit/in$^2$ or more without contact of the head slider with the disk in the radial direction, even if the disk is configured as a disk including a high polymer substrate in which the radius of curvature in the radial direction is about 10 m. Also, by specifying the length of the head slider in the range of 1.8 mm or less, it is possible to achieve the same high recording density as that described above without contact of the head slider with the disk in the circumferential direction, even if the disk is formed with a high polymer substrate in which the radius of curvature in the circumferential direction is about 20 m. Further, by specifying the width W of the head slider in the range of 1.5 mm or less and the length L of the head slider in the range of 1.25 mm or less, it is possible to ensure the flight height of the head slider in the range of 25 nm or less, and the variation in flight height in the range of 10% or less of the flight height, that is, in the range of 2.5 nm or less, and hence to write or read data on or from a disk without contact of the head slider with the disk, even if the disk is formed with a high polymer substrate in which the radius of curvature in the radial direction is about 10 m and the radius of curvature in the circumferential direction is about 20 m.

More specifically, in the case of flying the head slider having a width W of 1.0 mm, a length L of 1.25 mm, and a height H of 0.43 mm in such a manner as to face to the surface of the disk including a high polymer substrate in which the radius of curvature in the radial direction is 10 m and the radius of curvature in the circumferential direction is 20 m in order to allow the head to record or reproduce data on or from the disk, the head slider does not come in contact with the disk. In addition, the disk used has a glide height of 10 nm to 20 nm or less, and the head slider used exhibits, upon operation thereof, a flight height in a range of 20 nm to 30 nm and a variation in flight height in a range of about 10% or less of the flight height.

It should be noted that the lower limit of the width W of the head slider must be set at about 0.5 mm and the lower limit of the length L of the head slider must be set at about 0.5 mm in order to form an air flow-in/flow-out passage necessary for stable flying of the head slider over the disk surface facing the head slider.

Hereinafter, concrete configuration examples of the head slider of the disk drive of the present invention will be described with reference to FIGS. 10(a) to 10(c), FIG. 11, FIGS. 12(a) and 12(b), and FIG. 13.

Figure 4:
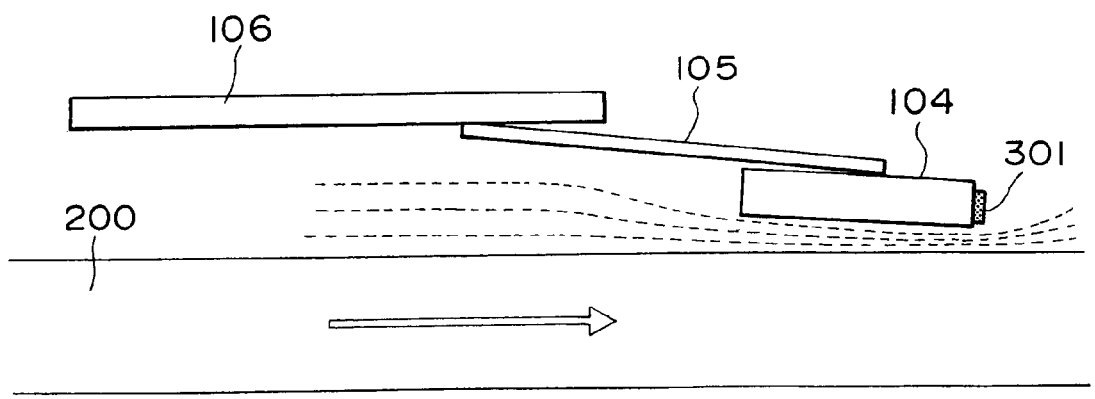
FIG. 4 is a sectional view showing a layer configuration of the general magnetic disk.
Figure 5:
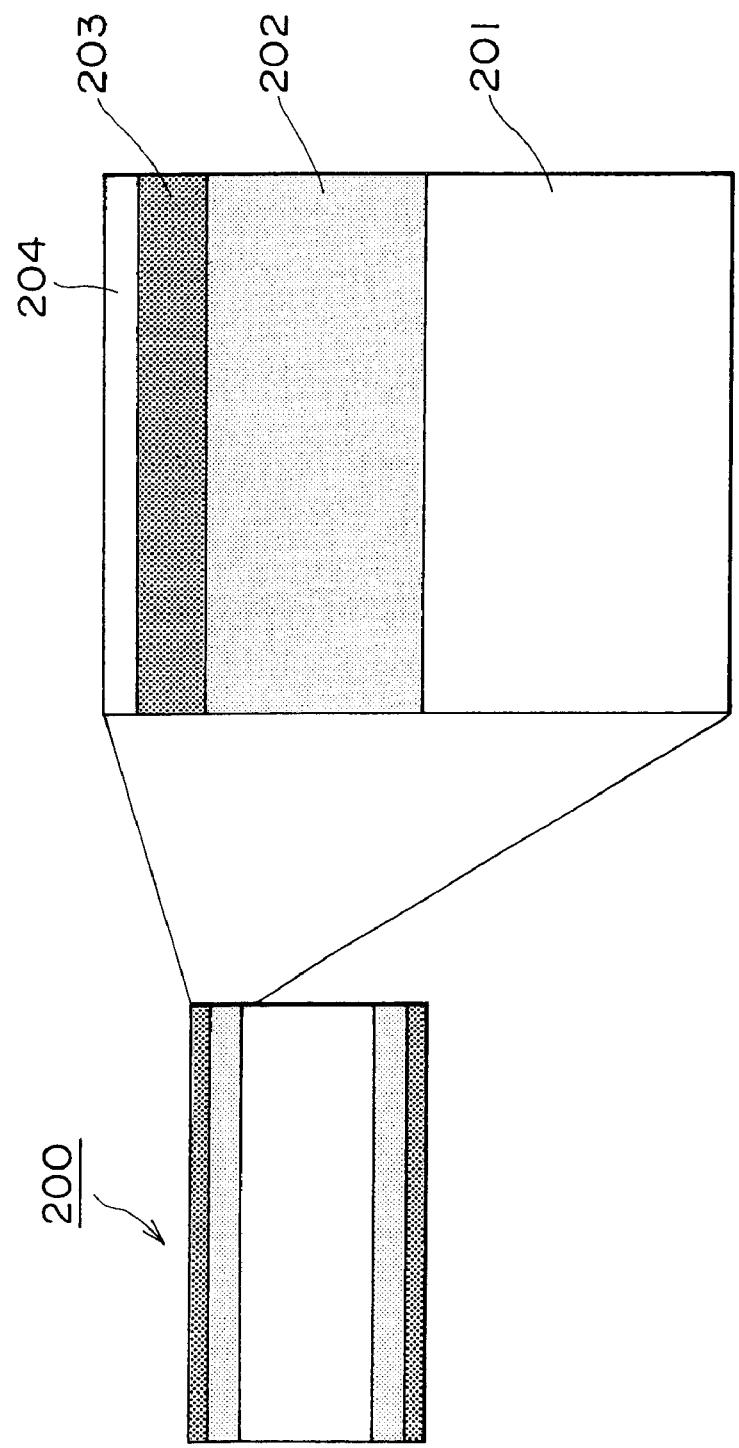
FIG. 5 is a sectional view showing a layer configuration of a disk including a substrate made from a high polymer material.
Figure 10C:
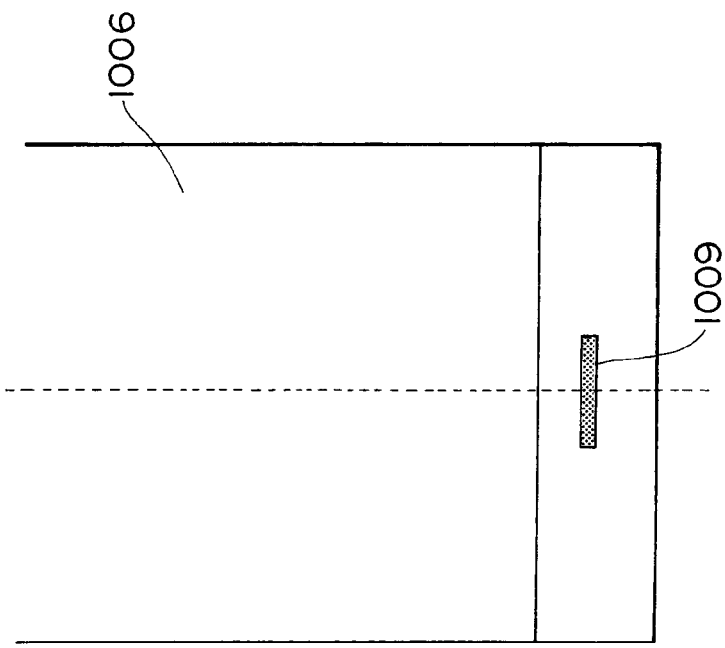
FIGS. 10(a) to 10(c) are views showing head slider configurations for a disk drive of the present invention.
Figure 10A:
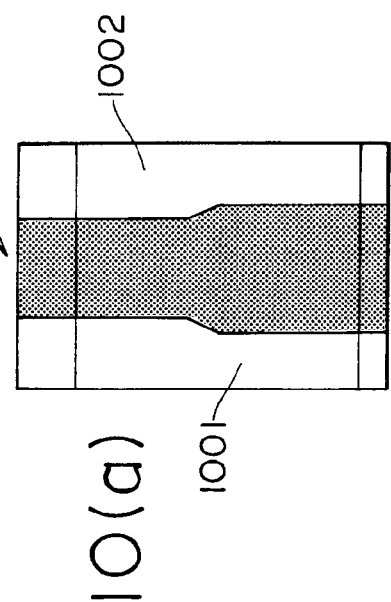
Figure 10B:
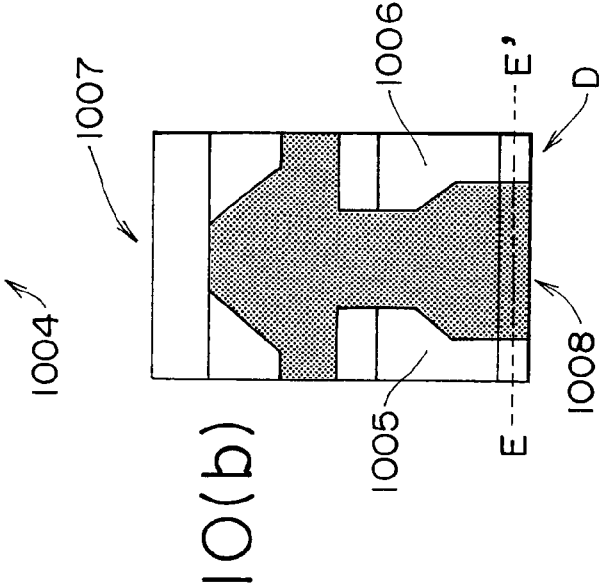

FIGS. 10(a) and 10(b) are plan views each showing a surface, facing to a disk, of a head slider of the disk drive of the present invention. In each of FIGS. 10(a) and 10(b), the air flow-out end of the head slider at which the head is mounted is located on the lower side of the figure, and an elastic supporting member and an arm (not shown) are located on the upper side of the figure. To be more specific, the direction toward the tip of the head slider 104, that is, the rightward direction in FIG. 4 is equivalent to the downward direction in each of FIGS. 10(a) and 10(b). The head slider shown in FIG. 10(a) has rails 1001 and 1002 which are symmetrical in the width direction of the head slider and which continuously extend in the length direction of the head slider. These rails 1001 and 1002 project from the surface of the disk, and a gray region at the central portion in the figure is recessed therefrom. When the head slider is flied over the disk, air flows in from a flow-in side 1003 and flows out from a flow-out side 1004.

The configuration example of the head slider shown in FIG. 10(b) is characterized in that rails 1005 and 1006 are not continuous in the length direction of the head slider but are interrupted. In this configuration, air flows in from a flow-in side 1007 and flows out from a flow-out side 1008. FIG. 10(c) is an enlarged plan view of a portion, shown by an arrow D, of the tip (on the air flow-out side) of the rail 1006 shown in FIG. 10(b).

The disk drive of the present invention, which is applied to a disk formed with a high polymer substrate in which the radius of curvature is small, that is, the deformation is large, is configured so that the shape of the head slider is limited for preventing contact of the head slider with the disk, for example, with the width of the head slider set in the range of 1.5 mm or less and the length of the head slider set in the range of 1.25 mm or less. The radius of curvature of the disk, however, is not uniform over the surface of the disk but differs at respective portions on the surface of the disk. In particular, the degree of differences in radius of curvature between respective portions on the surface of the disk including a high polymer substrate is larger than that for a disk including a glass or aluminum substrate. Accordingly, in the case of flying the head slider against the disk including a high polymer substrate, the variation in flight height of the head slider due to the differences in radius of curvature between respective portions on the surface of the disk becomes larger than that in the case of flying the head slider against the disk including a glass or aluminum substrate.

According to the disk drive of the present invention, to further reduce a variation in flight height at the head mounting portion of the head slider caused by differences in radius of curvature between respective portions on the surface of the disk including a high polymer substrate, a head 1009 is provided on the rail at the center of the rail, that is, at the position shown by a broken line in FIG. 10(c), or in a region inwardly from the center of the rail, that is, on the left region from the broken line in FIG. 10(c). The head slider causes rolling over the disk, that is, rotation around the longitudinal axis of the head slider over the disk. At this time, the largest displacement by rolling occurs at both ends of the head slider in the width direction, more concretely, at the left end of the rail 1001 and the right end of the rail 1002 shown in FIG. 10(a) and at the left end of the rail 1005 and the right end of the rail 1006 shown in FIG. 10(b). Accordingly, if the head is disposed at the left or right end of the head slider, a variation in flight height of the head slider at the left or right end where the head is mounted becomes large. As a result, upon the recording/reproducing of data, a variation in spacing between the disk and the head slider at the left or right end where the head is mounted becomes large, to thereby degrade quality of recording/reproducing signals.

According to the head slider of the disk drive of the present invention, to reduce the variation in flight height of the head slider at the head mounting position, as shown in FIG. 10(c), the head 1009 is disposed at the center of the rail 1002 or inwardly from the center of the rail 1006. It should be noted that the head can be disposed at either or each of the right and left rails of the head slider.

Figure 11:
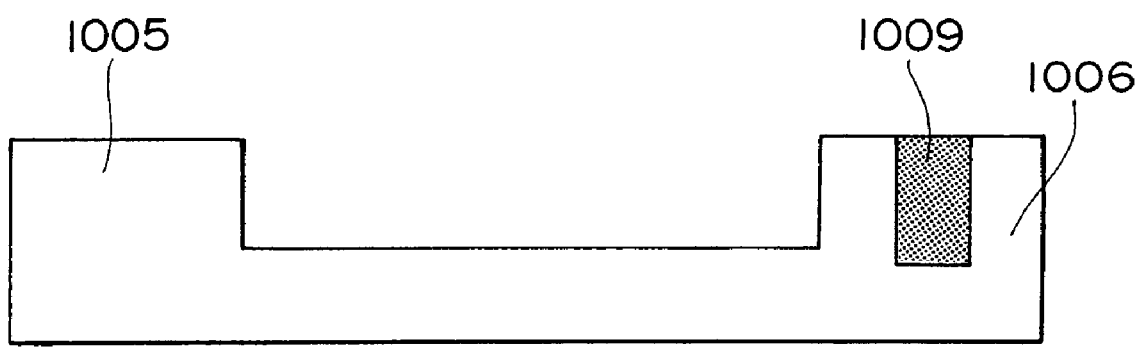
FIG. 11 is a sectional view showing a head mounting portion of the head slider configuration shown in FIG. 10(b).

FIG. 11 is a sectional view taken on line E–E' of FIG. 10(b), showing a state in which the head 1009 is disposed at the center of the rail 1006. By disposing the head 1009 at the center of the rail 1006 or inwardly from the center of the rail 1006 as shown in FIG. 11, it is possible to reduce the variation in flight height, caused by rolling, of the head slider at the head mounting position, and hence to prevent degradation of the quality of the data upon recording/reproducing of data.

Figure 12B:
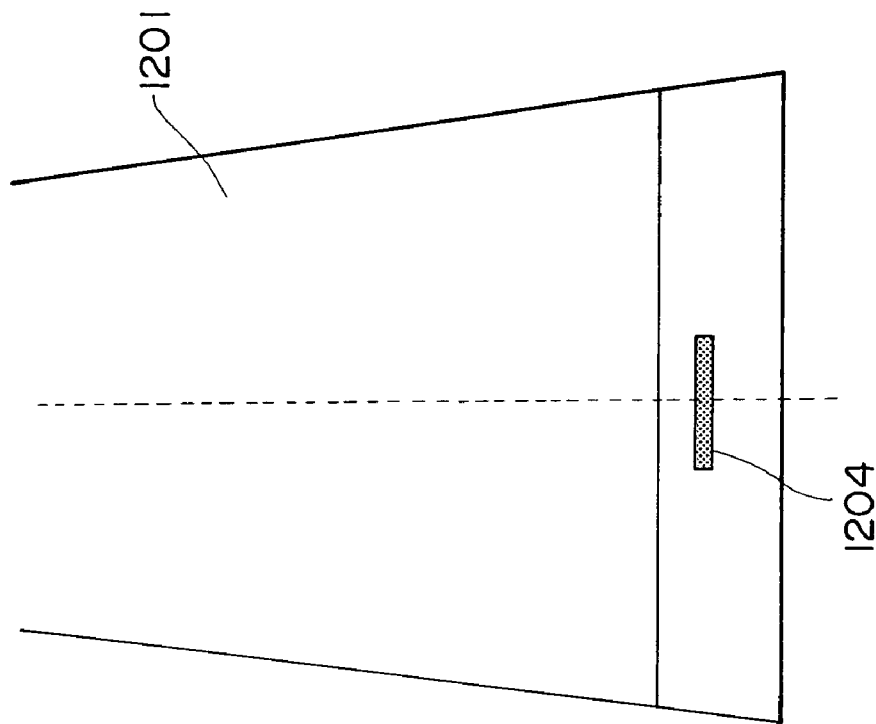
FIGS. 12(a) and 12(b) are views showing a further head slider configuration for the disk drive of the present invention.
Figure 12A:
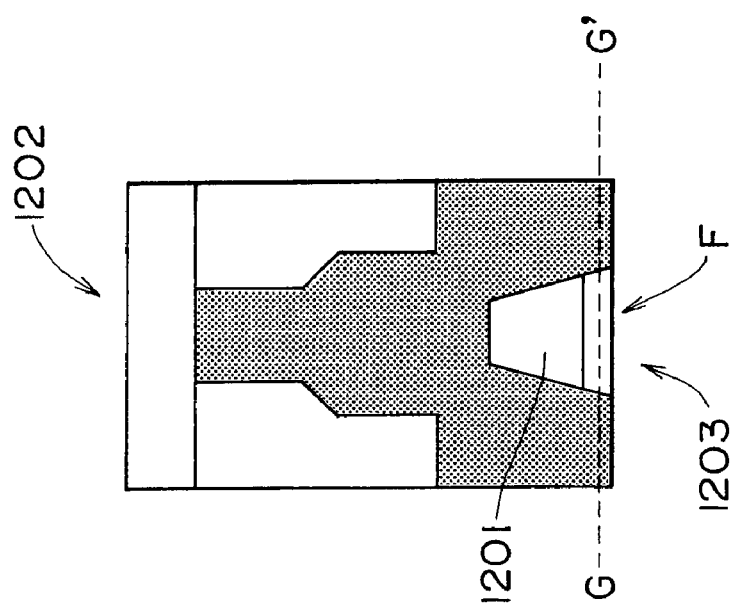
Figure 13:
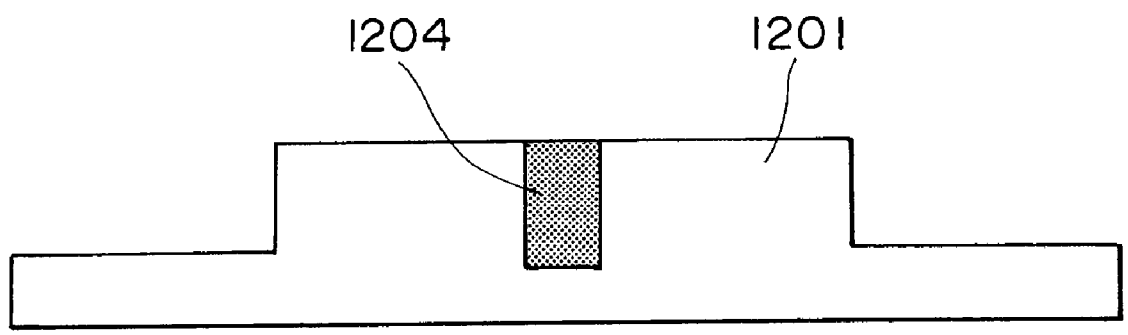
FIG. 13 is a sectional view showing a head mounting portion of the head slider configuration shown in FIG. 12(a).

FIGS. 12(a) and 12(b) and FIG. 13 show another configuration of a head slider of the disk drive of the present invention. FIG. 12(a) shows a plan view of a surface, facing the disk, of the head slider. In FIG. 12(a), the tip of the head slider on which the head is mounted is located on the lower side of the figure, and an elastic supporting member and an arm (not shown) are located on the upper side of the figure. To be more specific, the direction toward the tip of the head slider 104, that is, the rightward direction in FIG. 4 is equivalent to the downward direction in FIG. 12(a). The head slider has an island rail 1201 at the central portion of the head slider. The rail 1201 projects from the surface of the head slider and a gray region in the figure is recessed therefrom. When the head slider is flied over the disk, air flows in from a flow-in side 1202 and flows out from a flowout side 1203.

FIG. 12(b) is an enlarged plan view of a portion shown by an arrow F at the tip of head slider shown in FIG. 12(a), that is, the island rail 1201. According to the head slider of the disk drive in this embodiment, to make small a variation in flight height of the head slider at the head mounting position, a head 1204 is disposed at the center of the rail 1201 as shown in FIG. 12(b).

FIG. 13 is a sectional view taken on line G–G' of FIG. 12(a), showing a state in which the head 1204 is disposed at the central portion of the rail 1201. By disposing the head 1204 at the center of the rail 1201, that is, the central portion of the slider, it is possible to reduce the variation in flight height, caused by rolling, of the head slider at the head mounting position, and hence to prevent degradation of the quality of the data upon recording/reproducing of data.

While the present invention has been described with reference to the specific embodiments, such description is for illustrative purposes only and should not be restrictively construed, and it is to be understood that changes and variations of the embodiments may be made by persons skilled in the art without departing from the scope of the present invention. For example, although the description has been made by example of the magnetic disk drive in the embodiment, the present invention can be applied not only to a magnetic disk drive but also to other disk drives for recording or reproducing information on or from a magneto-optical disk, an optical disk, and the like. The scope of the present invention is therefore to be determined solely by the appended claims.

As described above, according to the disk drive of the present invention, by specifying the width W and the length L of the head slider, it is possible to prevent contact of the head slider with a disk, even if the disk is configured as a disk including a high polymer substrate in which the radius of curvature is smaller than that of a disk formed with a glass or aluminum substrate, that is, the deformation is larger than that of the disk including the glass or aluminum substrate.

According to the disk drive of the present invention, by specifying the width W of the head slider in the range of 1.5 mm or less, it is possible to realize a high recording density of 10 Gbit/in$^2$ or more without contact of the head slider with a disk in the radial direction, even if the disk is configured as a disk including a high polymer substrate in which the radius of curvature in the radial direction is about 10 m. Further, by specifying the length of the head slider in the range of 1.8 mm or less, it is possible to achieve the same high recording density as that described above without the contact of the head slider with a disk in the circumferential direction, even in the case where the disk is configured as a disk including a high polymer substrate in which the radius of curvature in the circumferential direction is about 20 m. Further, by setting the width W of the head slider in the range of 1.5 mm or less and the length L of the head slider in the range of 1.25 mm or less, it is possible to ensure the flight height of the head slider in the range of 25 nm or less, and the variation in flight height in the range of 10% or less of the flight height, that is, in the range of 2.5 nm or less, and hence to write or read data on or from a disk without the contact of the head slider with the disk, even if the disk is configured as a disk including a high polymer substrate in which the radius of curvature in the radial direction is about 10 m and the radius of curvature in the circumferential direction is about 20 m.

According to the disk drive of the present invention, since the head is fixedly disposed at the center or inwardly from the center of either of the rails which are substantially symmetrical in the width direction of the head slider with respect to the longitudinal axis of the head slider, it is possible to reduce the variation in flight height of the head at the position where the head is disposed, and hence to reduce the variation in spacing between the disk and the head slider at the head mounting position upon recording/reproducing of data and thereby improve the quality of recording/reproducing signals.

According to the disk drive of the present invention, since the head is fixedly disposed at the center of the island rail disposed at the central portion of the head slider, that is, at the center of the tip of the head slider, it is possible to further reduce the variation in flight height of the head at the position where the head is disposed, and hence to further reduce the variation in spacing between the disk and the head slider at the head mounting position upon recording/reproducing of data and thereby further improve the quality of recording/reproducing signals.

What is claimed:

1. A disk drive for recording data to and/or reproducing data from a disk formed with a substrate made from a high polymer material, wherein said substrate has a first radius of surface curvature in a radial direction in a range of 10 m to 20 m and a second radius of surface curvature in a circumferential direction in a range of 20 m to 30 m, the disk drive comprising:

a head for flying above a surface of said disk upon rotation of said disk for recording data to and/or reproducing data from said disk; and a head slider on which said head is mounted, wherein said head slider is formed in a substantially rectangular shape having a width along a direction substantially parallel to said radial direction of said disk in a range of 0.5 mm to 1.5 mm and a length in a substantially perpendicular direction to said width direction in a range of 0.5 mm to 1.8 mm so that contact between said head slider and said disk is prevented.

2. The disk drive according to claim 1, wherein said head slider is mounted on an elastic supporting member constituting an actuator movable substantially in said radial direction of said disk;

said head slider has a projection on a surface facing said disk so that said projection projects toward said disk, where said projection is configured as two rails symmetrical in a width direction of said head slider with respect to a longitudinal axis of said head slider; and said head is mounted to a tip of at least one of said rails, a mounting position of said head being at one of a central portion of said rail in a width direction parallel to said width direction of said head slider and a position offset from said central portion of said rail toward a center of said head slider in said width direction.

3. The disk drive according to claim 1, wherein said head slider is mounted on an elastic supporting member constituting an actuator movable in said radial direction of said disk;

a surface of said head slider has a projection projecting toward said surface of said disk, said projection being configured as an island rail formed at a central portion of said head slider in said width direction; and said head is mounted to a tip of said rail, a mounting position of said head being one of a central portion and a position adjacent said central portion of said rail in said width direction parallel to said width direction of said head slider.

4. The disk drive according to claim 1, wherein said head slider has a length in a range of 1.25 mm to 0.5 mm.

5. The disk drive according to claim 1, wherein said substrate is made from one of polycarbonate, polyolefin, polystyrene, and poly methyl methacrylate.

6. The disk drive according to claim 1, wherein said substrate formed of high polymer material has a glide height is 15 nm or less.

7. The disk drive according to claim 1, wherein a flight height of said head slider is 25 nm or less.

8. The disk drive according to claim 7, wherein a variation in flight height is 10% or less of said flight height.

9. A disk drive for recording data to and/or reproducing data from a disk including a substrate made from a high polymer material, wherein said substrate has a first radius of surface curvature in a radial direction in a range of 10 m to 20 m and a second radius of surface curvature in a circumferential direction in a range of 20 m to 30 m, the disk drive comprising:

a head for flying above a surface of said disk upon rotation of said disk for recording data to and/or reproducing data from said disk; and a head slider on which said head is mounted and having a plurality of projections on a surface facing said disk, wherein said head slider is formed in a substantially rectangular shape having a width along a direction substantially parallel to said radial direction of said disk in a range of 0.5 mm to 1.5 mm and a length in a substantially perpendicular direction to said width direction in a range of 0.5 mm to 1.8 mm so that content between said head slider and said disk is prevented.

10. The disk drive according to claim 9, wherein said head slider is mounted on an elastic supporting member constituting an actuator movable substantially in said radial direction of said disk;

said plurality of projections are configured as two rails symmetrical in a width direction of said head slider with respect to a longitudinal axis of said head slider; and said head is mounted substantially at a tip of one of said rails, a mounting position of said head being one of a central portion of said rail in a width direction parallel to said width direction of said head slider and a position offset from said central portion of said rail toward a center of said head slider in said width direction.

11. The disk drive according to claim 9, wherein said head slider is mounted on an elastic supporting member constituting an actuator movable in said radial direction of said disk;

said plurality of projections having an island rail formed at a central portion of said head slider in said width direction; and said head is mounted substantially at a tip of aid rail, a mounting position of said head being substantially at a central portion of said rail in a width direction parallel to said width direction of said head slider.

12. The disk drive according to claim 9, wherein said head slider has a length in a range of 1.25 mm or less.

13. The disk drive according to claim 9, wherein said substrate is made from one of polycarbonate, polyolefin, polystyrene, and poly methyl methacrylate.

14. The disk drive according to claim 9, wherein said substrate formed of high polymer material has a glide height of 15 nm or less.

15. The disk drive according to claim 9, wherein a flight height of said head slider is 25 nm or less.

16. The disk drive according to claim 15, wherein a variation in flight height is 10% or less of said flight height.

17. A head slider having a magnetic head for recording data to and/or reproducing data from a disk including a substrate made from a high polymer material, wherein said substrate has a first radius of surface curvature in a radial direction in a range of 10 m to 20 m and a second radius of surface curvature in a circumferential direction in a range of 20 m to 30 m, the head slides comprising:

a plurality of projections provided on a surface facing said disk, wherein said head slider is formed into an approximately rectangular shape having a width along a direction substantially parallel to said radial direction of said disk in a range of 0.5 mm to 1.5 mm and a length in a substantially perpendicular direction to said width direction in a range of 0.5 mm to 1.8 mm so that contact between said head slider and said disk is prevented.

18. The head slider according to claim 17, wherein said plurality of projections are configured as two rails symmetrical in said width direction of said head slider with respect to a longitudinal axis of said head slider; and said head is mounted substantially at a tip of one of said rails, a mounting position of said head being one of central portion of said rail in a width direction parallel to said width direction of said head slider and a position offset from said central portion of said rail toward a center of said head slider in said width direction.

19. The head slider according to claim 17, wherein said plurality of projections comprise an island rail formed at a central portion of said head slider in said width direction; and said head is mounted substantially at a tip of said rail, a mounting position of said head being substantially at a central portion of said rail in a width direction parallel to said width direction of said head slider.

20. The head slider according to claim 17, wherein said head slider has a length in a range of 1.25 mm or less.

21. The head slider according to claim 17, wherein said substrate is made from one of polycarbonate, polyolefin, polystyrene, and poly methyl methacrylate.

22. The head slider according to claim 17, wherein said high polymer substrate has a glide height of 15 nm or less.

23. The head slider according to claim 17, wherein a flight height of said head slider is 25 nm or less.

24. The head slider according to claim 23, wherein a variation in flight height is 10% or less of said flight height.

* * * * *